United States Patent

[11] 3,547,329

| [72] | Inventor | Frank Kalwaites<br>Somerville, N.J. |
|---|---|---|
| [21] | Appl. No. | 710,564 |
| [22] | Filed | March 5, 1968 |
| [45] | Patented | Dec. 15, 1970 |
| [73] | Assignee | Johnson & Johnson<br>a corporation of New Jersey |

[54] APPARATUS FOR MANUFACTURING SPLIT FIBER WEBS FROM ORIENTED PLASTIC FILMS
5 Claims, 2 Drawing Figs.

[52] U.S. Cl.................................................. 225/97;
  28/1, 83/660
[51] Int. Cl.................................................. B26f 1/24,
  B26f 3/00
[50] Field of Search........................................ 225/3, 93,
  97; 264/(Fibrillating Digest); 28/1(F); 83/660, 2

[56] References Cited
UNITED STATES PATENTS

| 2,853,741 | 9/1958 | Costa et al.................. | 28/1UX |
| 3,302,501 | 2/1967 | Greene......................... | 83/2 |
| 3,369,435 | 2/1968 | Boultinghouse............. | 225/97X |

*Primary Examiner*—James M Meister
*Attorneys*—Robert L. Minier, John H. Tregoning and Alexander T. Kardos ABSTRACT: A method and apparatus for forming split fiber webs from oriented plastic films comprising penetrating the oriented film on a group of sharp implements and, while penetrated, applying a plurality of forces in various directions to the film at least some of these forces being in the plane of the film whereby the film is fibrillated to form a web of interconnected fibers.

PATENTED DEC 15 1970

3,547,329

INVENTOR
FRANK KALWAITES
BY
ATTORNEY

APPARATUS FOR MANUFACTURING SPLIT FIBER WEBS FROM ORIENTED PLASTIC FILMS

This invention relates to an apparatus for manufacturing split fiber webs from oriented plastic films.

It is well known that highly oriented films oriented to the degree where they will readily form fibers may be split into fibrous networks by applying forces to the oriented film. Fiber orientation is parallel orientation in one direction and the film has very little strength in the direction perpendicular to the direction of orientation.

The major problem with most of the prior techniques for splitting oriented films to produce fibrous webs is that forces cannot be placed uniformly over the entire area of the film or the forces may be so great that the film will tear and form extremely large splits rather than forming a fibrous network.

I have now discovered an apparatus for splitting oriented plastic films in a uniform manner to produce fibrous networks. In accordance with my method and apparatus, the oriented film is split over its entire area to produce the fibrous network.

In accordance with the present invention, an oriented film which may be oriented either in the transverse or the long direction is impaled on a group of sharp tapered implements. The implements are allowed to actually penetrate through the film and, while the film is so impaled, a plurality of forces are applied to the film in various directions preferably completely randomly to form small splits over the entire area of the film. Some of these forces must be in the plane of the film to form these tiny splits and produce a network of interconnected fibers.

The apparatus for carrying out the method of the present invention comprises a rotatable roll having its surface covered with sharp tapered implements or prongs. While the roll is rotating, the film is impaled on the sharp tapered implements. This may be accomplished by a set of guide rolls which place tension on the film and forces it onto the sharp implements. While the film is on the sharp implements, a rotatable brush roll brushes the film to apply a series of random forces in between the sharp implements and to the film to split it into a network of interconnected fibers. The film in the form of a split fiber web is then easily removed from the prongs.

The invention will be more fully described when taken in conjunction with the accompanying drawings wherein.

The films which may be used in accordance with the present invention are any of the various plastic films, preferably the polyolefins, which may be readily oriented in either the long or the cross direction by means well known in the art. Examples of such polyolefins are the polyethylenes and the polypropylenes. Other films which may be highly oriented so that they will form fibers may also be used in accordance with the present invention such as the polyamides or the polyesters.

Figure 1:
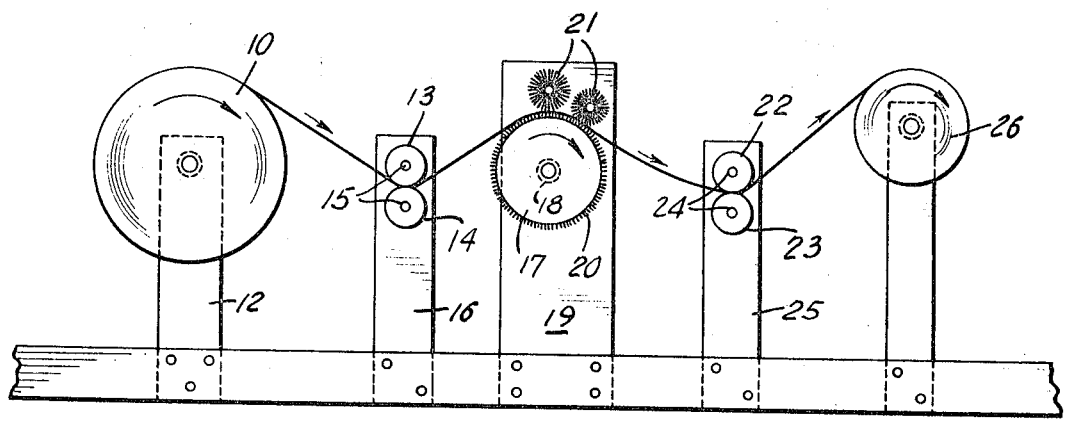
FIG. 1 is a side elevational view of apparatus for carrying out the method of the present invention.

Referring to FIG. 1, a roll of film 10 which has been highly oriented, that is oriented to its fiber degree, is mounted for rotation in bearings 11 mounted in suitable framing 12. The film passes through a set of guide rolls 13 and 14. These rolls are mounted for rotation in bearings 15 mounted in suitable framing 16. The film then passes onto a rotatable roll 17 mounted for rotation in bearings 18 mounted in suitable framing 19. The surface of this rotatable roll is covered with prongs 20 or sharp tapered implements. The uppermost portion of the surface of this roll is higher than the nip of the guide rolls which causes, as long as the film is under tension, the film to be penetrated by the prongs. Upon being penetrated, there are one or more, as desired, brushing rolls 21 which apply a plurality of random forces to the film while it is impaled on the prongs. The brushes are mounted for rotation in bearings mounted in the framing 19. The film passes to a second set of guide rolls 22 and 23 mounted in suitable bearings 24 mounted in framing 25 and onto standard windup means 26.

Figure 2:
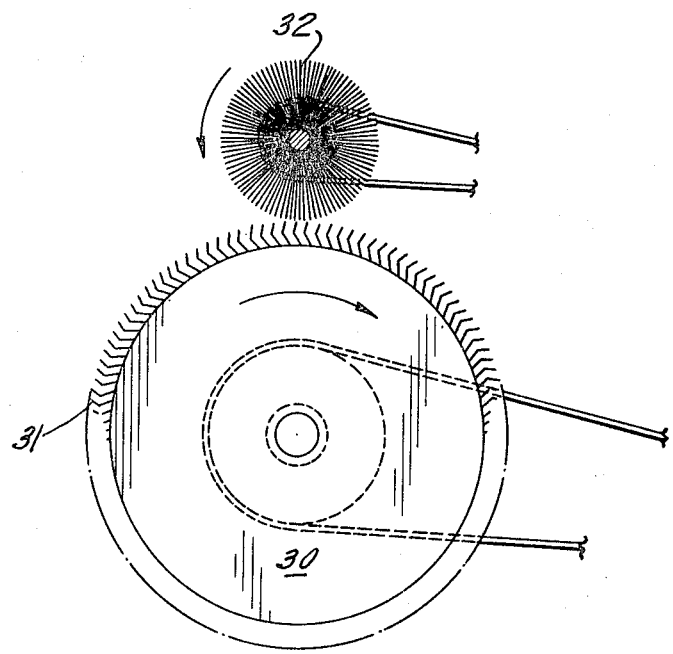
FIG. 2 is an enlarged cross-sectional view of the impaling means and the brushing roll in accordance with the present invention.

As may be more clearly seen in FIG. 2, the rotatable roll 30 has prongs 31 or sharp tapered implements over its entire surface. These prongs may be metal needles or filet card clothing or metallic card clothing, as desired. The roll rotates in the direction of the arrow shown. Mounted adjacent the surface of this roll is a rotatable brush roll 33. The rotatable brush roll may rotate in the direction of the arrow shown or it may rotate in the opposite direction. It is preferred that this brush roll rotate either faster or slower than the peripheral linear speed of the pronged roll. It has been found that if the peripheral linear speed of the brush roll is twice that of the pronged roll, excellent results are obtained. The tips of the brush or wires or needles on the brush roll pass in between the prongs in random directions depending on where they meet the prongs, the speed of the rolls, etc. The brush roll may have relatively soft or relatively stiff bristles. Nylon bristles have been found suitable. If desired, more than one brush roll may be placed along the surface of the pronged roll to contact the film while it is penetrated by the prongs.

The brush roll may also vibrate or reciprocate axially, if desired, to place even further random forces upon the film as it is impaled.

In operation, the film is under slight tension and initially sits on the teeth or the prongs of the rotatable roll. The tension should be great enough to cause the sharp implements to penetrate the film, however, if this does not happen, the bristles will force the film down and around the teeth and, once impaled on the teeth, will apply a plurality of forces both downwardly and many forces in the plane of the film to split the oriented film into an interconnected web of fibers. The film after being split readily releases because of its openings from the prongs on the cylinder.

In splitting the oriented film most of the fibers are formed in the direction of orientation, that is, if a cross oriented film is used, the fibers more or less have their predominant orientation in the cross direction and, if a longitudinally oriented film is used, most of the fibers will have their direction of orientation in the longitudinal direction.

It should be understood that various standard parts have been omitted from the description and the drawings such as driving means, speed ratio mechanisms, frames, etc. These are all standard and are well known in the art and have only been omitted for purposes of clarity in both the drawings and description.

It should also be understood that various changes and modifications may be made to the present invention without departing from the spirit and scope thereof.

I claim:

1. Apparatus for fibrillating oriented plastic film for forming a network of interconnected fibers comprising: a rotatable roll having its surface covered with sharp tapered implements, means for impaling the oriented film on said implements, a plurality of rotatable brush rolls mounted with their axis parallel to the axis of the rotatable roll and positioned adjacent and in contact with the sharp tapered implements to apply a plurality of forces in random direction to the film while it is impaled on said implements, whereby the film is split into a network of interconnected fibers and means for removing the network from said implements.

2. Apparatus according to claim 1 wherein the rotatable roll has its surface covered with wire card clothing.

3. Apparatus according to claim 1 which includes means for rotating at least one of said rotatable brush rolls in the opposite direction of the rotatable roll and at a peripheral linear speed faster than the peripheral linear speed of the rotatable roll.

4. Apparatus for fibrillating oriented plastic film to form a network of interconnected fibers comprising: a rotatable roll having its surface covered with sharp tapered implements, means for impaling the oriented film on said implements, a rotatable brush roll mounted with its axis parallel to the axis of the rotatable roll and positioned adjacent and in contact with the sharp tapered implements, means for rotating said brush roll in the opposite direction of the rotatable roll and at a peripheral linear speed faster than the peripheral linear speed of the rotatable roll to apply a plurality of forces in a random direction to the film while it is impaled on said implements, whereby the film is split into a network of interconnected fibers and means for removing the network from said implements.

5. Apparatus according to claim 4 wherein the rotatable roll has its surface covered with wire card clothing.